US012601832B2

(12) United States Patent
Lin et al.

(10) Patent No.: US 12,601,832 B2
(45) Date of Patent: Apr. 14, 2026

(54) MULTI-RADAR BASED DETECTION DEVICE AND DETECTION METHOD FOR TARGET OBJECT

(71) Applicant: Wistron Corporation, New Taipei City (TW)

(72) Inventors: Hsiao Yi Lin, Hsinchu City (TW); Kaijen Cheng, New Taipei City (TW); Kai-Chung Cheng, New Taipei City (TW); Yao-Tsung Chang, New Taipei City (TW); Yin-Yu Chen, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 252 days.

(21) Appl. No.: 18/395,696

(22) Filed: Dec. 25, 2023

(65) Prior Publication Data

US 2025/0147172 A1     May 8, 2025

(30) Foreign Application Priority Data

Nov. 6, 2023     (TW) ................................. 112142617

(51) Int. Cl.
| | |
|---|---|
| *G01S 13/87* | (2006.01) |
| *G01S 7/41* | (2006.01) |
| *G01S 13/42* | (2006.01) |
| *G01S 13/88* | (2006.01) |

(52) U.S. Cl.
CPC .............. *G01S 13/87* (2013.01); *G01S 7/415* (2013.01); *G01S 13/42* (2013.01); *G01S 13/886* (2013.01)

(58) Field of Classification Search
CPC .......... G01S 7/415; G01S 13/42; G01S 13/87; G01S 13/886
USPC .......................................................... 342/59
See application file for complete search history.

(56) References Cited

U.S. PATENT DOCUMENTS

| | | | |
|---|---|---|---|
| 12,135,388 B2 | 11/2024 | Cheng | |
| 2015/0109164 A1 | 4/2015 | Takaki | |
| 2020/0064456 A1* | 2/2020 | Xu .......................... G01S 13/765 |
| 2020/0408875 A1* | 12/2020 | Mai .......................... G01S 7/006 |

(Continued)

FOREIGN PATENT DOCUMENTS

| | | |
|---|---|---|
| JP | 2003043159 | 2/2003 |
| JP | 2004251628 | 9/2004 |
| JP | 2018077196 | 5/2018 |

*Primary Examiner* — Brady W Frazier
(74) *Attorney, Agent, or Firm* — JCIPRNET

(57) ABSTRACT

A multi-radar based detection device and detection method for a target object are provided. In the detection method, a first detection result corresponding to a first detection space and a second detection result corresponding to a second detection space are received. The first detection space entering a first status is determined in response to the first detection result indicating that the target object in the first detection space moves to an overlapping area between the first detection space and the second detection space. First information is output in response to determining that the first detection space enters the first status. The second detection space entering a second status is determined in response to the second detection result indicating that the target object not in the second detection space appears in the overlapping area. Second information is output in response to determining that the second detection space enters the second status.

20 Claims, 18 Drawing Sheets

(56)                    References Cited

U.S. PATENT DOCUMENTS

| | | | |
|---|---|---|---|
| 2021/0215789 A1* | 7/2021 | Hu | G01S 7/415 |
| 2021/0270955 A1* | 9/2021 | Billaud | G01S 13/91 |
| 2021/0311166 A1* | 10/2021 | Wu | G01S 13/003 |
| 2022/0026531 A1* | 1/2022 | Wu | G01S 13/88 |
| 2022/0299598 A1 | 9/2022 | Cheng | |
| 2023/0039666 A1* | 2/2023 | Hevdeli | G01S 7/411 |
| 2023/0042452 A1* | 2/2023 | Amir | G01S 13/56 |

* cited by examiner 41    42    43

44
45
46

47
48
49

A target person is in a detection space

The target person is not in the detection space

A target person is in a detection space

The target person is not in the detection space

A target person is in a detection space

The target person is not in the detection space

A target person is in a detection space

The target person is not in the detection space

A target person is in a detection space

The target person is not in the detection space

A target person is in a detection space

The target person is not in the detection space

A target person is in a detection space

The target person is not in the detection space

MULTI-RADAR BASED DETECTION DEVICE AND DETECTION METHOD FOR TARGET OBJECT

CROSS-REFERENCE TO RELATED APPLICATION

This application claims the priority benefit of Taiwan application serial no. 112142617, filed on Nov. 6, 2023. The entirety of the above-mentioned patent application is hereby incorporated by reference herein and made a part of this specification.

BACKGROUND OF THE INVENTION

Field of the Invention

The invention relates to a radar detection technique, and in particular to a multi-radar based detection device and detection method for a target object.

Description of Related Art

Due to social changes and aging, more and more elderly people live alone. How to care for these elderly people living alone has become a major issue that today's society needs to face. In addition to utilizing social group forces such as social service personnel or volunteers to conduct visits, if there is a care equipment with remote detection function, the care recipient may be immediately assisted when an emergency occurs. Existing remote detection devices are mainly based on wearable devices or imaging equipment identification. When installing location detection devices in private indoor spaces, in order to reduce the invasion of the privacy of the care recipient, a radar may be used to detect care recipient to prevent images of the care recipient from being recorded. However, when the living environment of the care recipient includes a plurality of spaces, the detection range of a single radar may not completely cover the living environment. Therefore, it is usually necessary to set up a dedicated radar for each independent space. Therefore, how to integrate information of a plurality of radar systems to effectively detect the care recipient is one of the important issues in the art.

SUMMARY OF THE INVENTION

The invention provides a multi-radar based detection device and detection method for a target object that may integrate detection results from a plurality of radars to provide a user with correct information.

An embodiment of the invention provides a multi-radar based detection device for a target object. The detection device includes a human-machine interface, a transceiver, and a processor. A first detection result corresponding to a first detection space and a second detection result corresponding to a second detection space are received from a plurality of radars. The processor is coupled to the human-machine interface and the transceiver and configured to perform: determining that the first detection space enters a first status in response to the first detection result indicating that the target object in the first detection space moves to an overlapping area between the first detection space and the second detection space; outputting first information via the human-machine interface in response to determining that the first detection space enters the first status, wherein the first information indicates that the target object is located in the first detection space; determining that the second detection space enters a second status in response to the second detection result indicating that the target object not in the second detection space appears in the overlapping area; and outputting second information via the human-machine interface in response to determining that the second detection space enters the second status, wherein the second information indicates that the target object is not in the second detection space.

An embodiment of the invention provides a multi-radar based detection method for a target object, the detection method including: receiving a first detection result corresponding to a first detection space and a second detection result corresponding to a second detection space from a plurality of radars; determining that the first detection space enters a first status in response to the first detection result indicating that the target object in the first detection space moves to an overlapping area between the first detection space and the second detection space; outputting first information via a human-machine interface in response to determining that the first detection space enters the first status, wherein the first information indicates that the target object is located in the first detection space; determining that the second detection space enters a second status in response to the second detection result indicating that the target object not in the second detection space appears in the overlapping area; and outputting second information via the human-machine interface in response to determining that the second detection space enters the second status, wherein the second information indicates that the target object is not in the second detection space.

Based on the above, in the invention, the detection results of the plurality of radars may be fused to quickly and accurately determine the space where the target object is located and the status of the target object. In the invention, a variety of information may also be provided for the user to view via the human-machine interface, helping the user quickly understand the status of the target object or the detection space.

DESCRIPTION OF THE EMBODIMENTS

Figure 1:
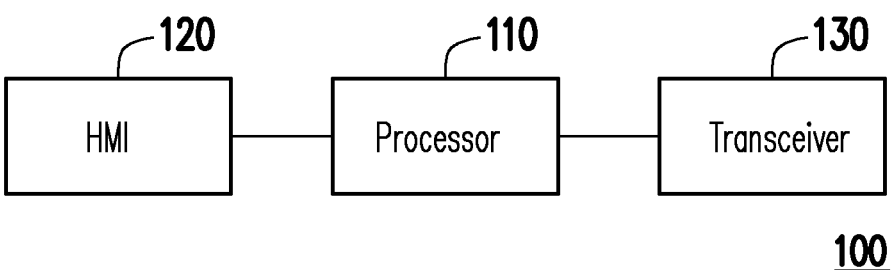
FIG. 1 shows a schematic diagram of a multi-radar based detection device for a target object according to an embodiment of the invention.

FIG. 1 shows a schematic diagram of a multi-radar based detection device 100 for a target object according to an embodiment of the invention. The detection device 100 may include a processor 110, a human-machine interface 120, and a transceiver 130.

The processor 110 is, for example, a central processing unit (CPU), or other programmable general-purpose or special-purpose micro control units (MCU), microprocessors, digital signal processors (DSP), programmable controllers, application-specific integrated circuits (ASIC), graphics processing units (GPU), image signal processors (ISP), image processing units (IPU), arithmetic logic units (ALU), complex programmable logic devices (CPLD), field-programmable gate arrays (FPGA), or other similar components or a combination of the above components. The processor 110 may be coupled to the human-machine interface 120 and the transceiver 130 and access and execute various modules and applications stored in storage media.

The human-machine interface (HMI) 120 is used to receive information input from the user or output information for the user's reference. The human-machine interface 120 may include a device such as a touch screen.

The transceiver 130 transmits or receives a signal in a wireless or wired manner. The transceiver 130 may also execute an operation such as low noise amplification, impedance matching, frequency mixing, up or down frequency conversion, filtering, amplification, and the like. The detection device 100 may be communicatively connected to a plurality of radars respectively disposed at a plurality of locations via the transceiver 130, and receive the detection result of each of the radars on the detection space from the plurality of radars.

Figure 2:
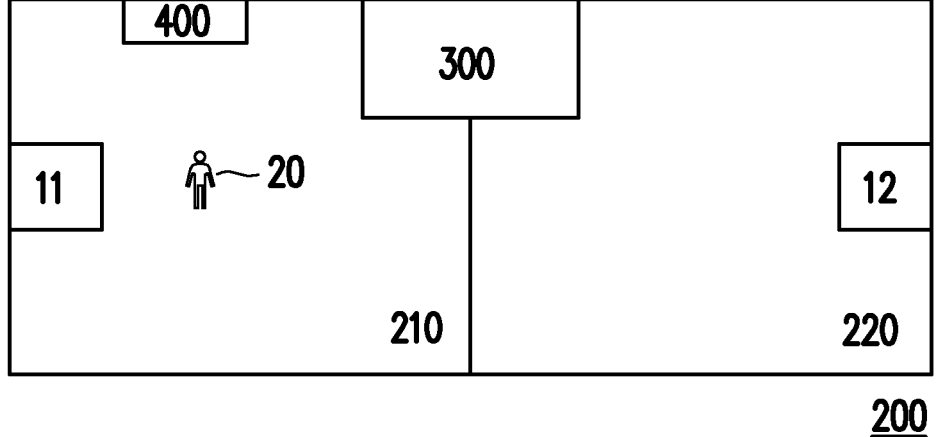
FIG. 2 shows a schematic diagram of a detection area according to an embodiment of the invention.

FIG. 2 shows a schematic diagram of a detection area 200 according to an embodiment of the invention. For example, the target object detected by the detection device 100 may be a target person (or a care recipient) 20, and the detection area 200 may be, for example, the area where the target person 20 lives. In the following embodiments, it is assumed that the detection area 200 includes two independent detection spaces 210 and 220, and the detection space 210 and the detection space 220 are overlapped with an overlapping area 300. The detection space 210 may include a default area 400. The default area 400 may be included in the detection space 210 or the detection space 220, wherein the default area 400 is, for example, an entrance or exit of the detection area 200. A radar 11 may be configured to monitor the detection space 210 and generate a corresponding detection result. A radar 12 may be configured to monitor the detection space 220 and generate a corresponding detection result. The detection device 100 may receive the detection result corresponding to the detection space 210 and the detection result corresponding to the detection space 220 from the radar 11 and the radar 12 respectively via the transceiver 130. The radar 11 or the radar 12 is, for example, a continuous wave (CW) radar used to detect information including the physiological status (for example, breathing or heartbeat) of the target person 20, a frequency modulation continuous wave (FMCW) radar or impulse radio ultra-wideband (IR-UWB) radar used to detect the movement of the target person 20 or to generate the detection result of the detection space, etc., but the invention is not limited thereto.

Figure 3:
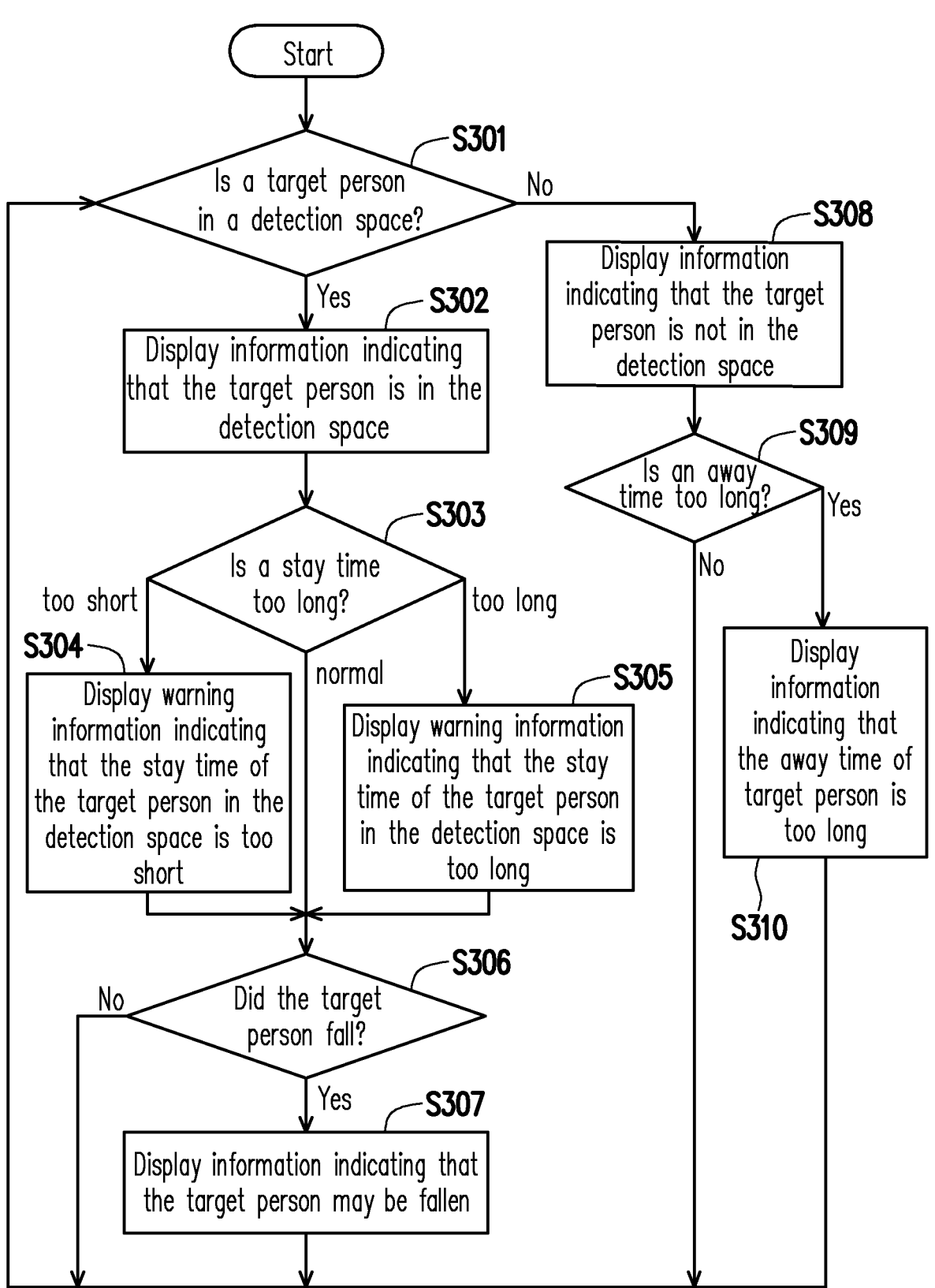
FIG. 3 shows a flowchart of a method for detecting a target person according to an embodiment of the invention.

FIG. 3 shows a flowchart of a method for detecting a target person according to an embodiment of the invention, wherein the method may be implemented by the detection device 100 shown in FIG. 1.

In step S301, the processor 110 may determine whether the target person 20 is in a detection space (for example, the detection space 210 or 220) based on a detection result of a radar (for example, the radar 11 or 12). If the target person 20 is in the detection space, step S302 is performed. If the target person 20 is not in the detection space, step S308 is performed. In an embodiment, the processor 110 may determine that the target person 20 is in the detection space based on the detection result of the radar including information associated with the physiological status of the target person 20, and may determine that the target person 20 is not in the detection space based on the detection result not including information associated with the physiological status of the target person.

In step S302, the processor 110 may display information indicating that the target person 20 is in the detection space via the human-machine interface 120 for the user's reference.

In step S303, the processor 110 may count the stay time of the target person 20 in the detection space based on the target person 20 being in the detection space, and determine whether the stay time is too long (for example: the stay time is greater than the threshold value or the upper limit), too short (for example: the stay time is less than the threshold value or the lower limit), or normal (for example: the stay time is less than or equal to the upper limit and greater than or equal to the lower limit). If the stay time is too short, step S304 is performed. If the stay time is too long, step S305 is performed. If the stay time is normal, step S306 is performed.

In step S304, the processor 110 may display a warning message indicating that the stay time of the target person 20 in the detection space is too short via the human-machine interface 120.

In step S305, the processor 110 may display a warning message indicating that the stay time of the target person 20 in the detection space is too long via the human-machine interface 120.

In step S306, the processor 110 may determine whether the target person 20 fell in the detection space according to the detection result. If it is determined that the target person 20 fell, step S307 is performed. If it is determined that the target person 20 did not fall, step S301 is performed again after a period of time.

Specifically, the processor 110 may obtain a plurality of point cloud data respectively corresponding to a plurality of time points from the detection result of the radar of the target person 20 and the detection space, and perform object detection on the plurality of point cloud data to generate a plurality of bounding boxes respectively corresponding to the plurality of time points. The processor 110 may determine whether the person fell based on changes in the bounding boxes.

In an embodiment, the processor 110 may determine the speed, height, or inclination angle change of the target person 20 according to the plurality of bounding boxes, and determine whether the target person 20 fell according to the speed, height, or inclination angle change.

Figure 4A:
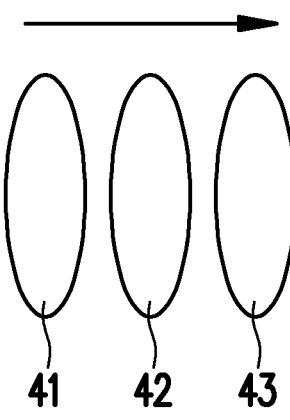
FIG. 4A, FIG. 4B, and FIG. 4C show schematic diagrams of changes of a bounding box according to an embodiment of the invention.
Figure 4B:
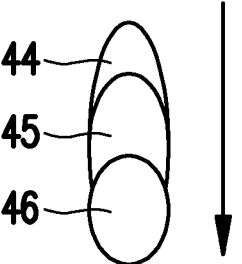
Figure 4C:
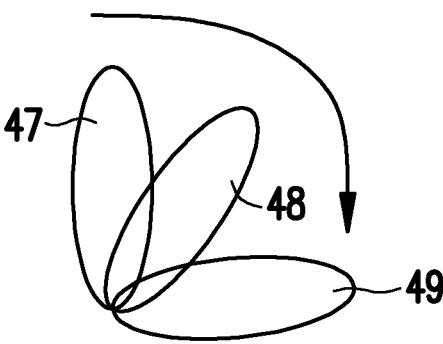

FIG. 4A, FIG. 4B, and FIG. 4C show schematic diagrams of changes of a bounding box according to an embodiment of the invention. Referring to FIG. 4A, it is assumed that the processor 110 obtains bounding boxes 41, 42, and 43 corresponding to the point clouds of the target person 20 in time sequence. The processor 110 may determine the speed of the target person 20 during the default period (e.g., 5 seconds) according to the bounding boxes 41, 42, and 43. If the speed of the target person 20 is greater than the threshold value (for example: 50 cm/second), the processor 110 may determine that the target person 20 may have fallen.

Referring to FIG. 4B, it is assumed that the processor 110 obtains bounding boxes 44, 45, and 46 corresponding to the target person 20 in time sequence. The processor 110 may determine the height of the centroid or center of gravity of the target person 20 according to the bounding boxes 44, 45, and 46. If the height of the centroid or the center of gravity of the target person 20 is less than the threshold value (e.g., 50 cm), the processor 110 may determine that the target person 20 may have fallen.

Referring to FIG. 4C, it is assumed that the processor 110 obtains bounding boxes 47, 48, and 49 corresponding to the point cloud of the target person 20 in time sequence. The processor 110 may determine the inclination angle change of the target person 20 according to the bounding boxes 47, 48, and 49. If the inclination angle change of the target person 20 is greater than the threshold value (e.g., 45 degrees), the processor 110 may determine that the target person 20 may have fallen.

Returning to FIG. 3, in step S307, the processor 110 may display information indicating that the target person 20 may have fallen via the human-machine interface 120 for the user's reference.

In step S308, the processor 110 may display information indicating that the target person 20 is not in the detection space via the human-machine interface 120 for the user's reference.

In step S309, the processor 110 may count the away time of the target person 20 after leaving the detection space and determine whether the away time is too long (for example: the away time is greater than the threshold value or the upper limit) based on the fact that the target person 20 is not in the detection space. If it is determined that the away time is too long, step S310 is performed. If it is determined that the away time is not too long, step S301 is performed again after a period of time.

In step S310, the processor 110 may display information indicating that the away time of the target person 20 is too long via the human-machine interface 120 for the user's reference.

Figure 5:
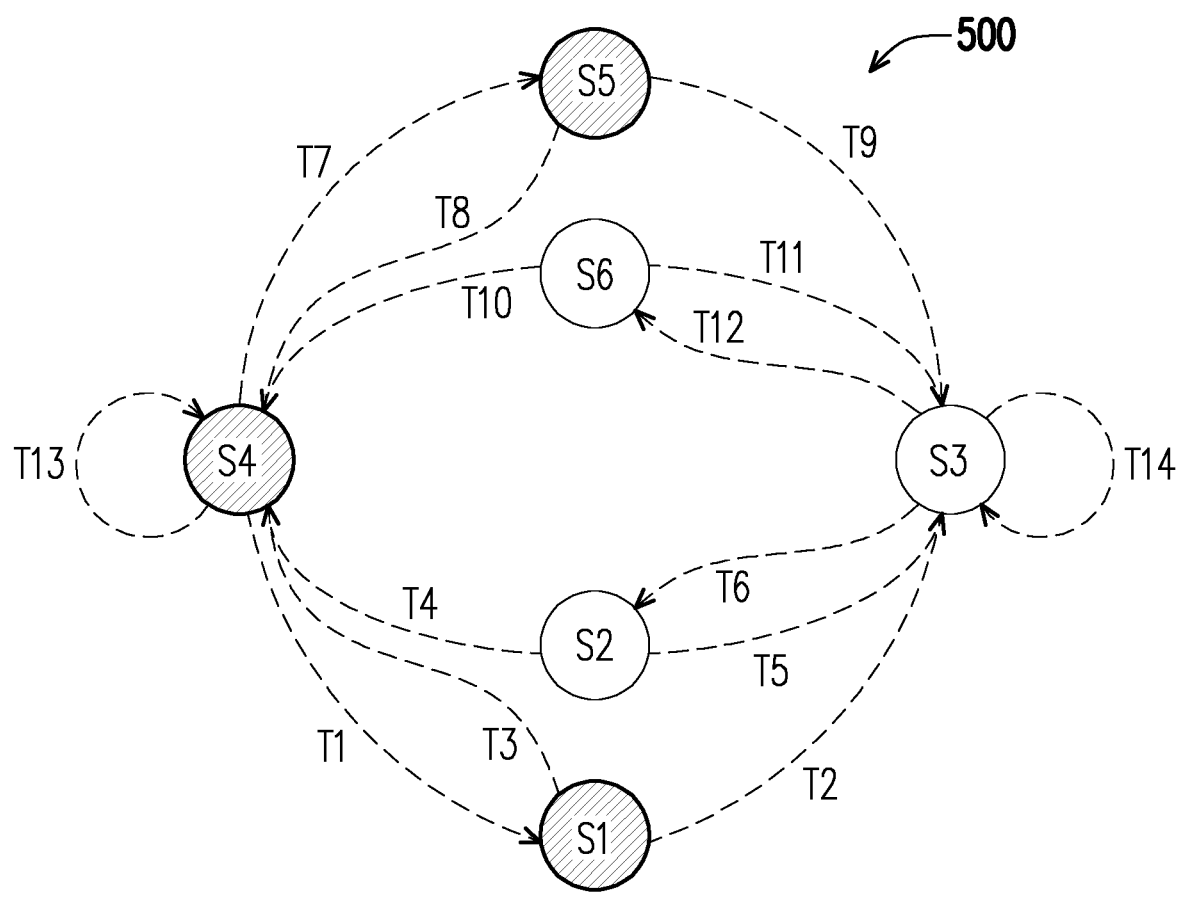
FIG. 5 shows a schematic diagram of a first status machine of a detection space according to an embodiment of the invention.

FIG. 5 shows a schematic diagram of a first status machine 500 of a detection space (for example, the detection space 210 or 220) according to an embodiment of the invention. The processor 110 may determine the current status of the detection space according to the detection result of each of the radars and the status machine 500, and output corresponding information according to the status of the detection space via the human-machine interface 120, wherein the information is used to indicate whether the target person is located in the detection space. Taking the detection space 210 as an example, the status machine 500 may include the following statuses and transition conditions.

Status S1: the target person 20 fades out of the detection space 210. When the detection space 210 is in the status S1, the processor 110 outputs information indicating that the target person 20 is in the detection space 210 via the human-machine interface 120.

Status S2: the target person 20 fades in the detection space 210. When the detection space 210 is in the status S2, the processor 110 outputs information indicating that the target person 20 is not in the detection space 210 via the human-machine interface 120.

Status S3: the target person 20 is not detected in the detection space 210. When the detection space 210 is in the status S3, the processor 110 outputs information indicating that the target person 20 is not in the detection space 210 via the human-machine interface 120.

Status S4: the target person 20 is detected in the detection space 210. When the detection space 210 is in the status S4, the processor 110 outputs information indicating that the target person 20 is in the detection space 210 via the human-machine interface 120.

Status S5: the target person 20 is about to leave the detection space 210. When the detection space 210 is in the status S5, the processor 110 outputs information indicating that the target person 20 is in the detection space 210 via the human-machine interface 120.

Status S6: the target person 20 is about to enter the detection space 210. When the detection space 210 is in the status S6, the processor 110 outputs information indicating that the target person 20 is not in the detection space 210 via the human-machine interface 120.

Transition condition T1: when the detection space 210 is in the status S4, the detection result indicates that the target person 20 located in the detection space 210 moves to the overlapping area 300 from the detection space 210. The processor 110 may determine that the detection space 210 is switched to the status S1 from the status S4 when the transition condition T1 is satisfied.

Transition condition T2: when the detection space 210 is in the status S1, the detection result indicates that the target person 20 disappears from the detection space 210. The processor 110 may determine that the detection space 210 is switched to the status S3 from the status S1 when the transition condition T2 is satisfied.

Transition condition T3: when the detection space 210 is in the status S1, the detection result indicates that the target person 20 moves to the detection space 210 from the overlapping area 300. The processor 110 may determine that the detection space 210 is switched to the status S4 from the status S1 when the transition condition T3 is satisfied.

Transition condition T4: when the detection space 210 is in the status S2, the detection result indicates that the target person 20 moves to the detection space 210 from the overlapping area 300. The processor 110 may determine that the detection space 210 is switched to the status S4 from the status S2 when the transition condition T4 is satisfied.

Transition condition T5: when the detection space 210 is in the status S2, the detection result indicates that the target person 20 disappears from the detection space 210. The processor 110 may determine that the detection space 210 is switched to the status S3 from the status S2 when the transition condition T5 is satisfied.

Transition condition T6: when the detection space 210 is in the status S3, the detection result indicates that the target person 20 not in the detection space 210 appears in the overlapping area 300. The processor 110 may determine that the detection space 210 is switched to the status S2 from the status S3 when the transition condition T6 is satisfied.

Transition condition T7: when the detection space 210 is in the status S4, the detection result indicates that the target person 20 located in the detection space 210 disappears from the detection space 210. The processor 110 may determine that the detection space 210 is switched to the status S5 from the status S4 when the transition condition T7 is satisfied.

Transition condition T8: when the detection space 210 is in the status S5, the detection result indicates that the target person 20 appears in the detection space 210. The processor 110 may determine that the detection space 210 is switched to the status S4 from the status S5 when the transition condition T8 is satisfied.

Transition condition T9: when the detection space 210 is in the status S5, the detection result indicates that the target person 20 is not detected in the detection space 210 (that is, the target person 20 does not appear in the detection space 210). The processor 110 may determine that the detection space 210 is switched to the status S3 from the status S5 when the transition condition T9 is satisfied.

Transition condition T10: when the detection space 210 is in the status S6, the detection result indicates that the target person 20 does not disappear from the detection space 210. The processor 110 may determine that the detection space 210 is switched to the status S4 from the status S6 when the transition condition T10 is satisfied.

Transition condition T11: when the detection space 210 is in the status S6, the detection result indicates that the target person 20 disappears from the detection space 210. The processor 110 may determine that the detection space 210 is switched to the status S3 from the status S6 when the transition condition T11 is satisfied.

Transition condition T12: when the detection space 210 is in the status S3, the detection result indicates that the target person 20 not in the detection space 210 appears in the detection space 210. The processor 110 may determine that the detection space 210 is switched to the status S6 from the status S3 when the transition condition T12 is satisfied.

Transition condition T13: when the detection space 210 is in the status S4, the detection result indicates that the target person 20 located in the detection space 210 appears in the detection space 210. The processor 110 may determine that the detection space 210 is switched to the status S4 from the status S4 when the transition condition T13 is satisfied.

Transition condition T14: when the detection space 210 is in the status S3, the detection result indicates that the target person 20 not in the detection space 210 appears in the detection space 210. The processor 110 may determine that the detection space 210 is switched to the status S3 from the status S3 when the transition condition T14 is satisfied.

Figure 6:
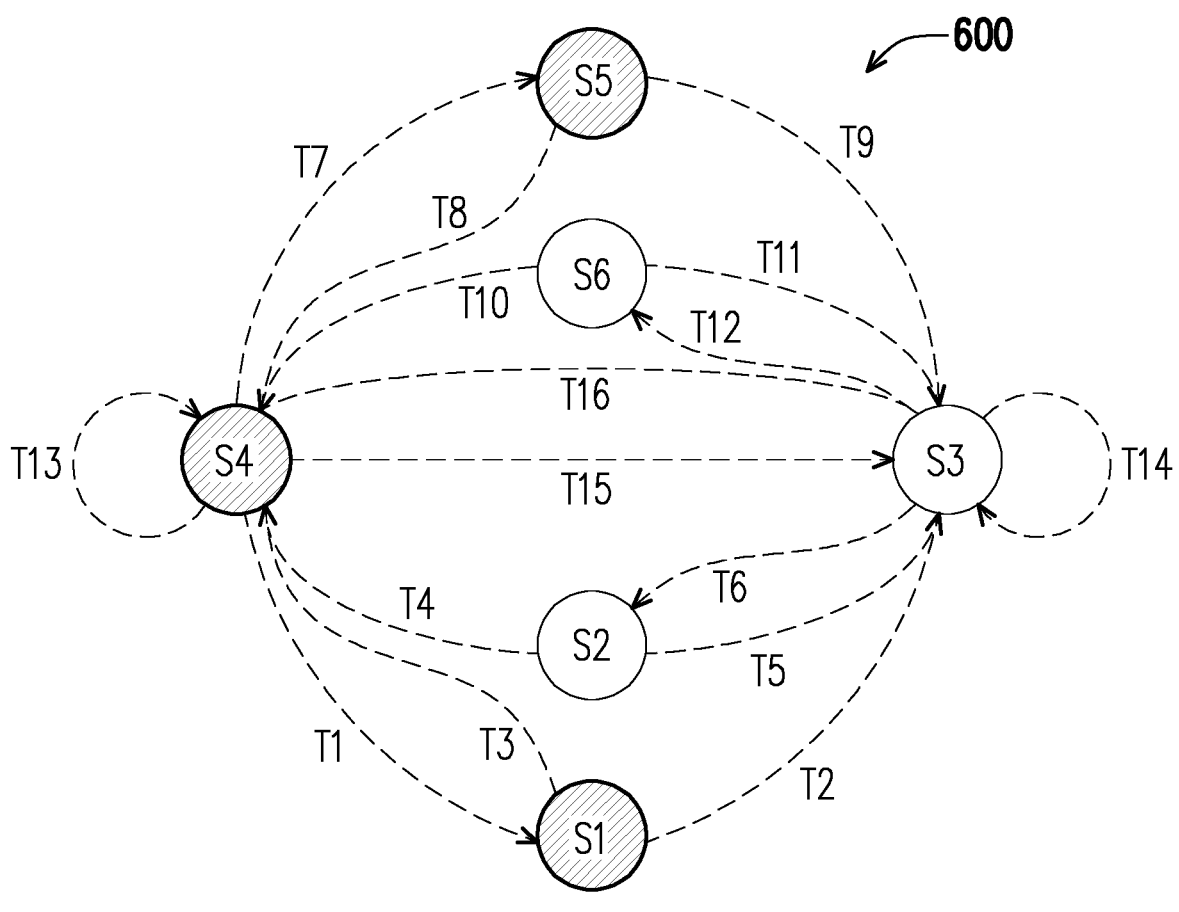
FIG. 6 shows a schematic diagram of a second status machine of a detection space according to an embodiment of the invention.

FIG. 6 shows a schematic diagram of a second status machine 600 of a detection space (for example, the detection space 210 or 220) according to an embodiment of the invention. The processor 110 may determine the current status of the detection space according to the detection result of each of the radars and the status machine 600, and output corresponding information according to the status of the detection space via the human-machine interface 120, wherein the information is used to indicate whether the target person is located in the detection space. Taking the detection space 210 as an example, compared to the status machine 500, the status machine 600 further includes the following transition conditions.

Transition condition T15: when the detection space 210 is in the status S4, the detection result indicates that the target person 20 located in the detection area 200 disappears from the default area 400. The processor 110 may determine that the detection space 210 is switched to the status S3 from the status S4 when the transition condition T15 is satisfied.

Transition condition T16: when the detection space 210 is in the status S3, the detection result indicates that the target person 20 not in the detection space 210 appears in the default area 400. The processor 110 may determine that the detection space 210 is switched to the status S4 from the status S3 when the transition condition T16 is satisfied.

Figure 7A:
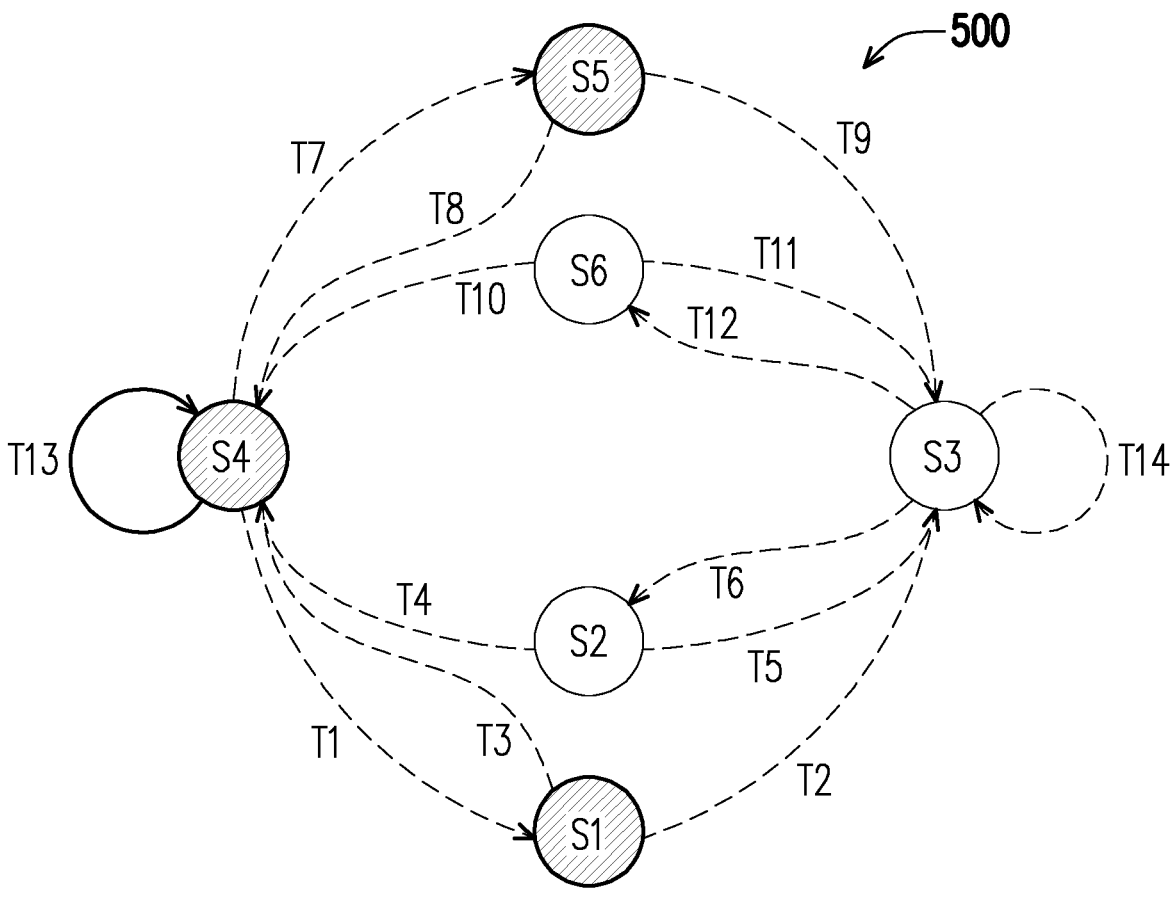
FIG. 7A and FIG. 7B show schematic diagrams of a first example of status transition of a detection space according to an embodiment of the invention.
Figure 7B:
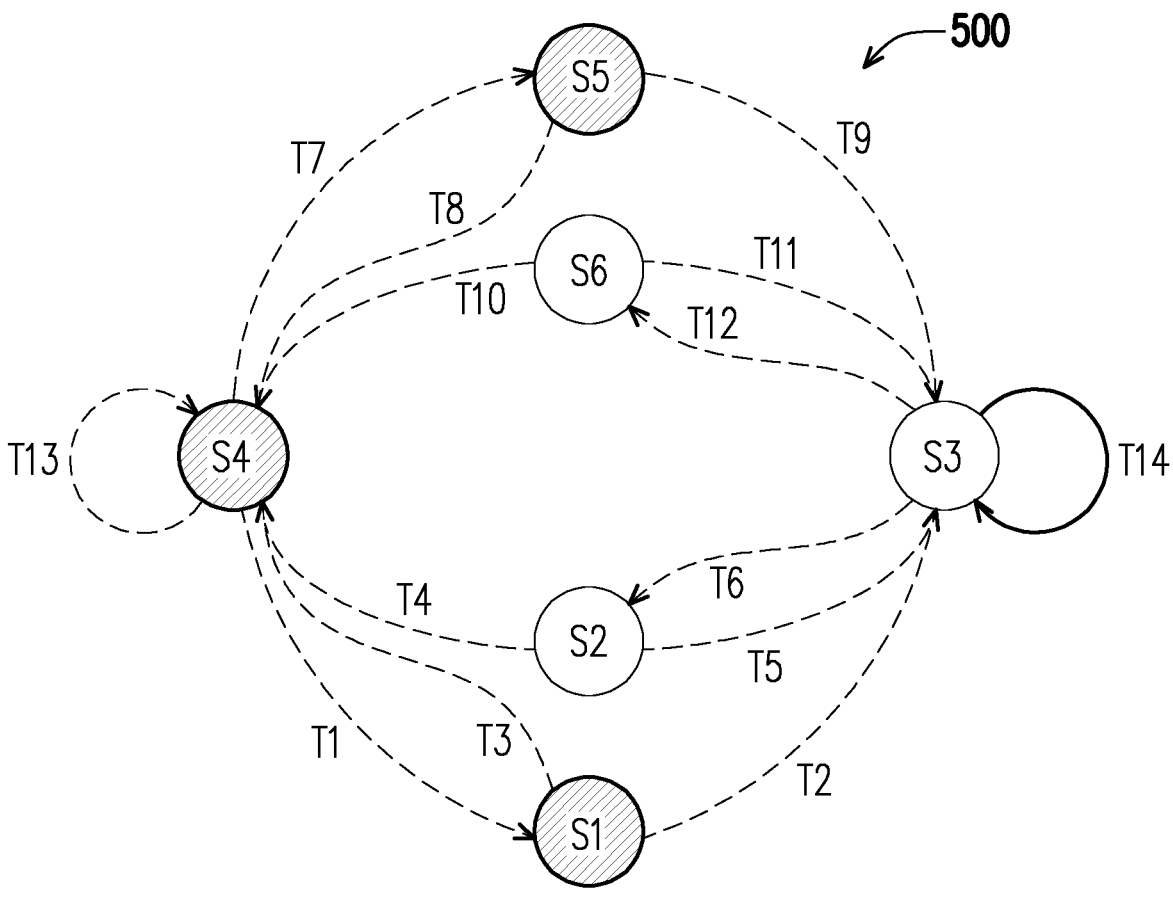

FIG. 7A and FIG. 7B are schematic diagrams showing a first example of status transition of a detection space according to an embodiment of the invention, wherein FIG. 7A shows the status machine 500 corresponding to the detection space 210, and FIG. 7B shows the status machine 500 corresponding to the detection space 220. It is assumed that the target person 20 is in the detection space 210. The status S4 of the detection space 210 indicates that the target person 20 is located in the detection space 210, and the status S3 of the detection space 220 indicates that the target person 20 is not in the detection space 220. When the target person 20 does not move, the transition condition T13 of the detection space 210 and the transition condition T14 of the detection space 220 are respectively satisfied, so that the status of the detection space 210 is switched back to the status S4, and the status of the detection space 220 is switched to the status S3.

Figure 8A:
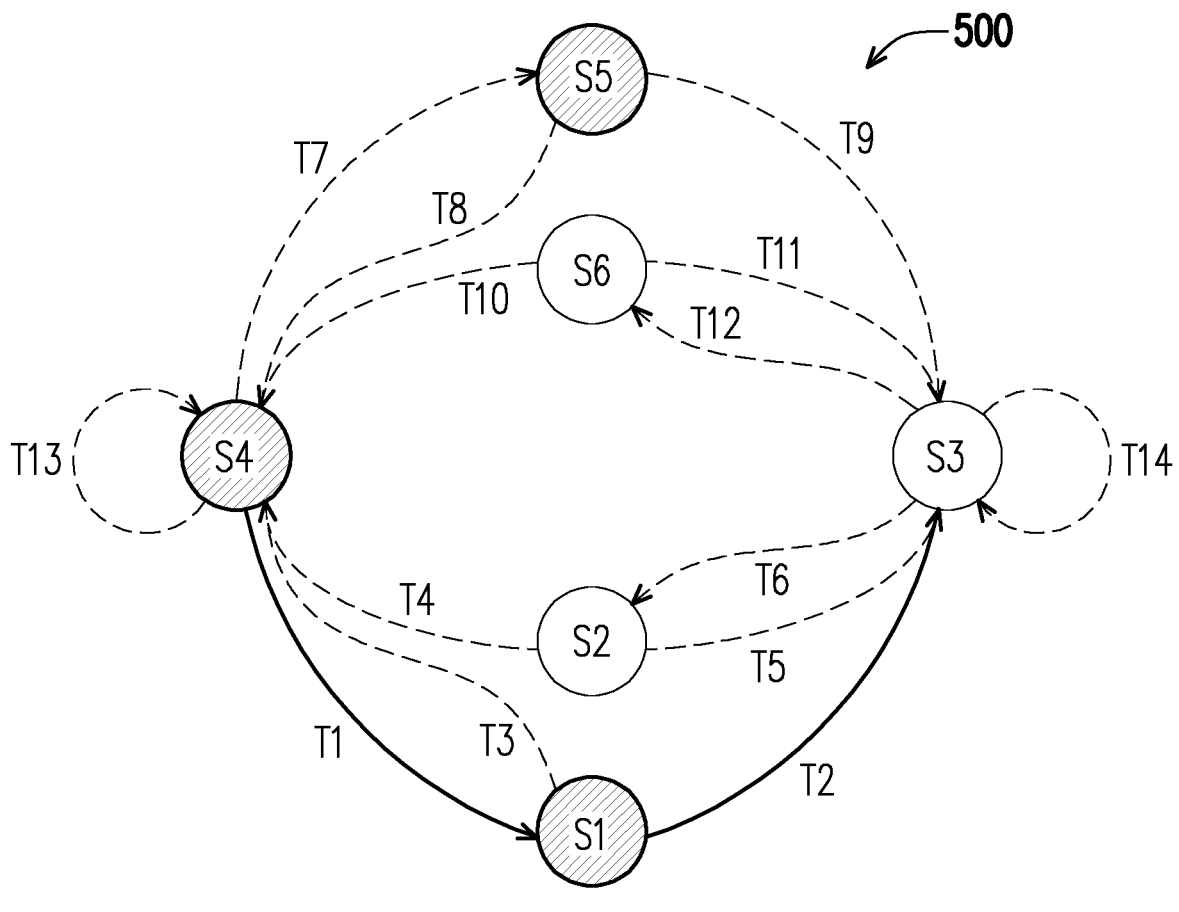
FIG. 8A and FIG. 8B show schematic diagrams of a second example of status transition of a detection space according to an embodiment of the invention.
Figure 8B:
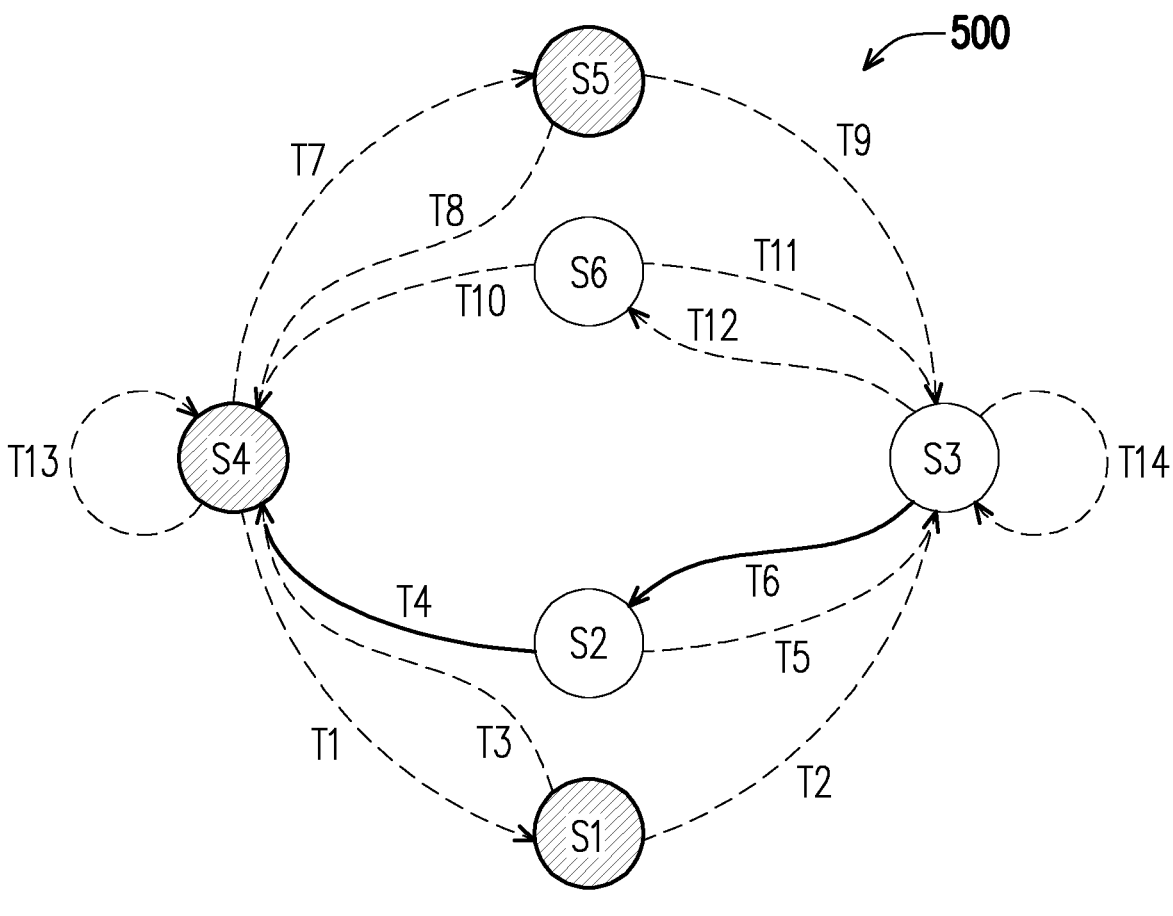

FIG. 8A and FIG. 8B are schematic diagrams showing a second example of status transition of a detection space according to an embodiment of the invention, wherein FIG. 8A shows the status machine 500 corresponding to the detection space 210, and FIG. 8B shows the status machine 500 corresponding to the detection space 220. It is assumed that the target person 20 is in the detection space 210. The status S4 of the detection space 210 indicates that the target person 20 is located in the detection space 210, and the status S3 of the detection space 220 indicates that the target person 20 is not in the detection space 220. If the target person 20 appears in the overlapping area 300, the transition condition T1 of the detection space 210 and the transition condition T6 of the detection space 220 are respectively satisfied, so that the status of the detection space 210 is switched to the status S1, and the status of the detection space 220 is switched to the status S2. Next, if the target person 20 disappears from the detection space 210 and moves to the detection space 220 from the overlapping area 300, the transition condition T2 of the detection space 210 and the transition condition T4 of the detection space 220 are respectively satisfied, so that the status of the detection space 210 is switched to the status S3, and the status of the detection space 220 is switched to the status S4.

Figure 9A:
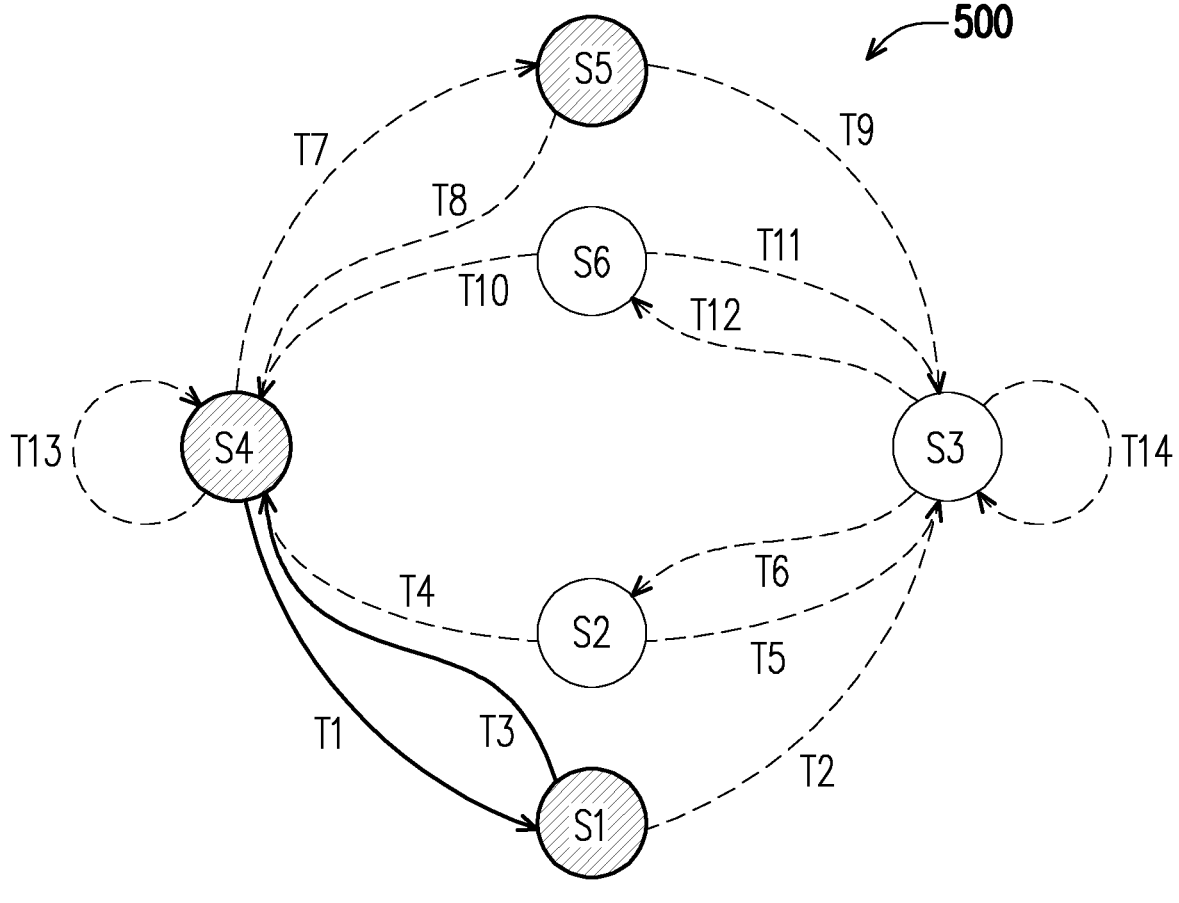
FIG. 9A and FIG. 9B show schematic diagrams of a third example of status transition of a detection space according to an embodiment of the invention.
Figure 9B:
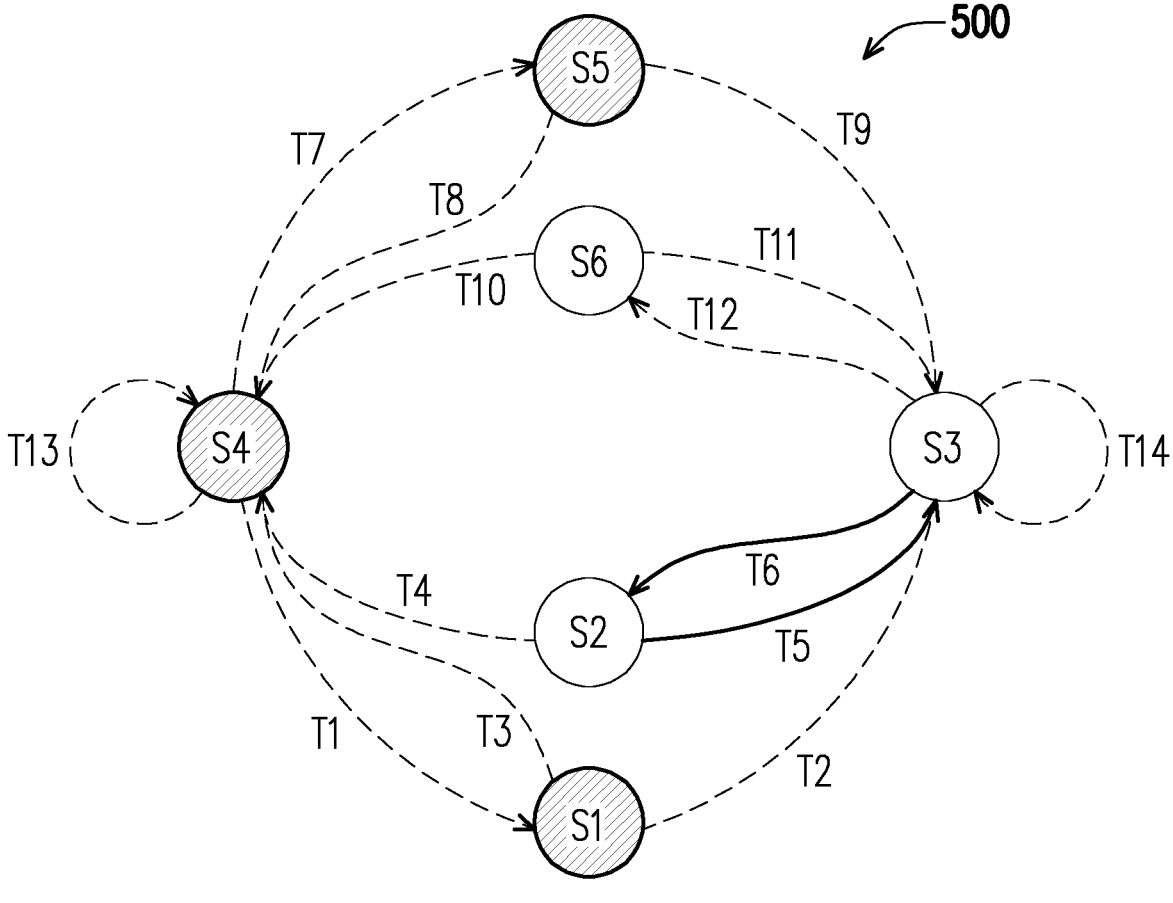

FIG. 9A and FIG. 9B are schematic diagrams showing a third example of status transition of a detection space according to an embodiment of the invention, wherein FIG. 9A shows the status machine 500 corresponding to the detection space 210, and FIG. 9B shows the status machine 500 corresponding to the detection space 220. It is assumed that the target person 20 is in the detection space 210. The status S4 of the detection space 210 indicates that the target person 20 is located in the detection space 210, and the status S3 of the detection space 220 indicates that the target person 20 is not in the detection space 220. If the target person 20 appears in the overlapping area 300, the transition condition T1 of the detection space 210 and the transition condition T6 of the detection space 220 are respectively satisfied, so that the status of the detection space 210 is switched to the status S1, and the status of the detection space 220 is switched to the status S2. Next, if the target person 20 moved to the detection space 210 from the overlapping area 300 and disappears from the detection space 220, the transition condition T3 of the detection space 210 and the transition condition T5 of the detection space 220 are respectively satisfied, so that the status of the detection space 210 is switched to the status S4, and the status of the detection space 220 is switched to the status S3.

Figure 10A:
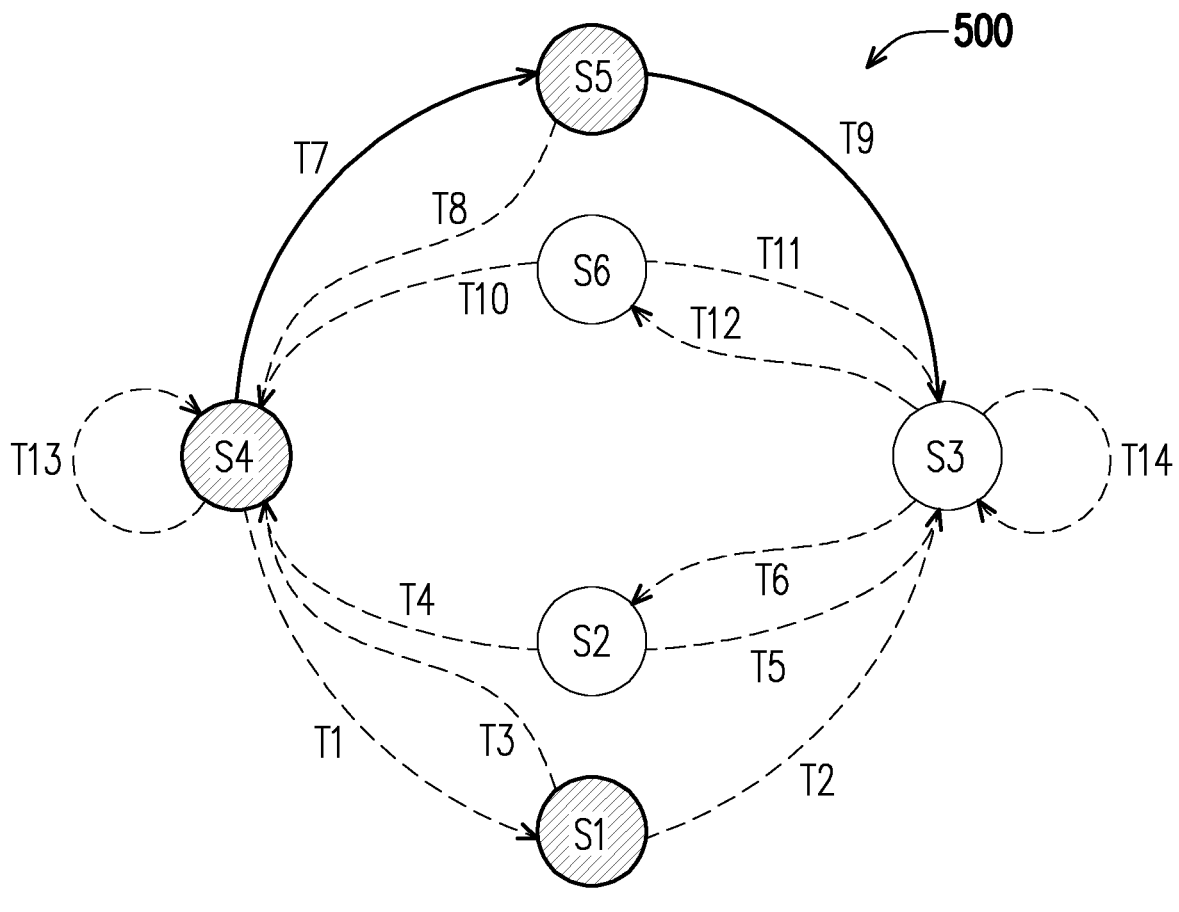
FIG. 10A and FIG. 10B show schematic diagrams of a fourth example of status transition of a detection space according to an embodiment of the invention.
Figure 10B:
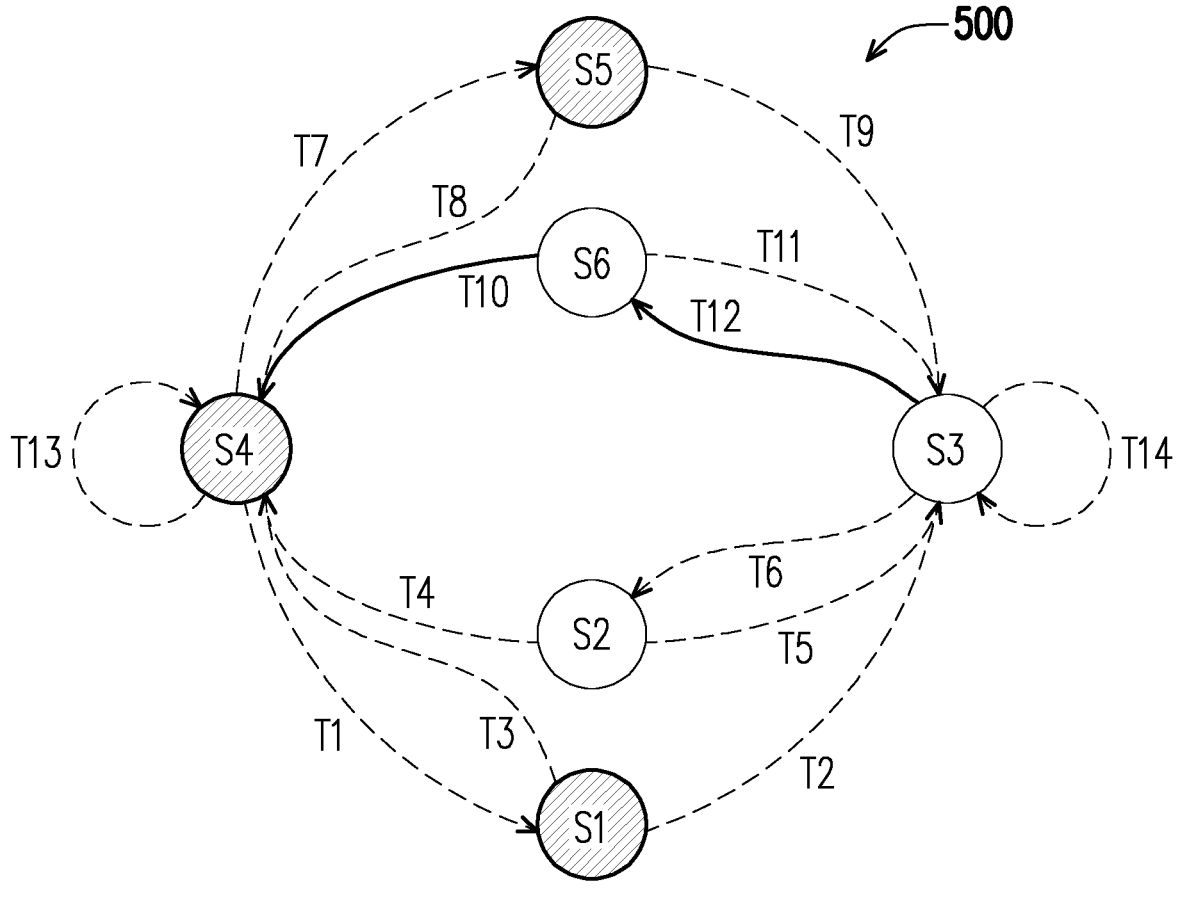

FIG. 10A and FIG. 10B are schematic diagrams showing a fourth example of status transition of a detection space according to an embodiment of the invention, wherein FIG. 10A shows the status machine 500 corresponding to the detection space 210, and FIG. 10B shows the status machine 500 corresponding to the detection space 220. It is assumed that the target person 20 is in the detection space 210. The status S4 of the detection space 210 indicates that the target person 20 is located in the detection space 210, and the status S3 of the detection space 220 indicates that the target person 20 is not in the detection space 220. If the target person 20 disappears from the detection space 210 and appears in the detection space 220, the transition condition T7 of the detection space 210 and the transition condition T12 of the detection space 220 are respectively satisfied, so that the status of the detection space 210 is switched to the status S5, and the status of the detection space 220 is switched to the status S6. Next, if the target person 20 does not appear in the detection space 210 after a period of time, and the target person 20 does not disappear from the detection space 220 after a period of time, the transition condition T9 of the detection space 210 and the transition condition T10 of the detection space 220 are respectively satisfied, so that the status of the detection space 210 is switched to the status S3, and the status of the detection space 220 is switched to the status S4.

Figure 11A:
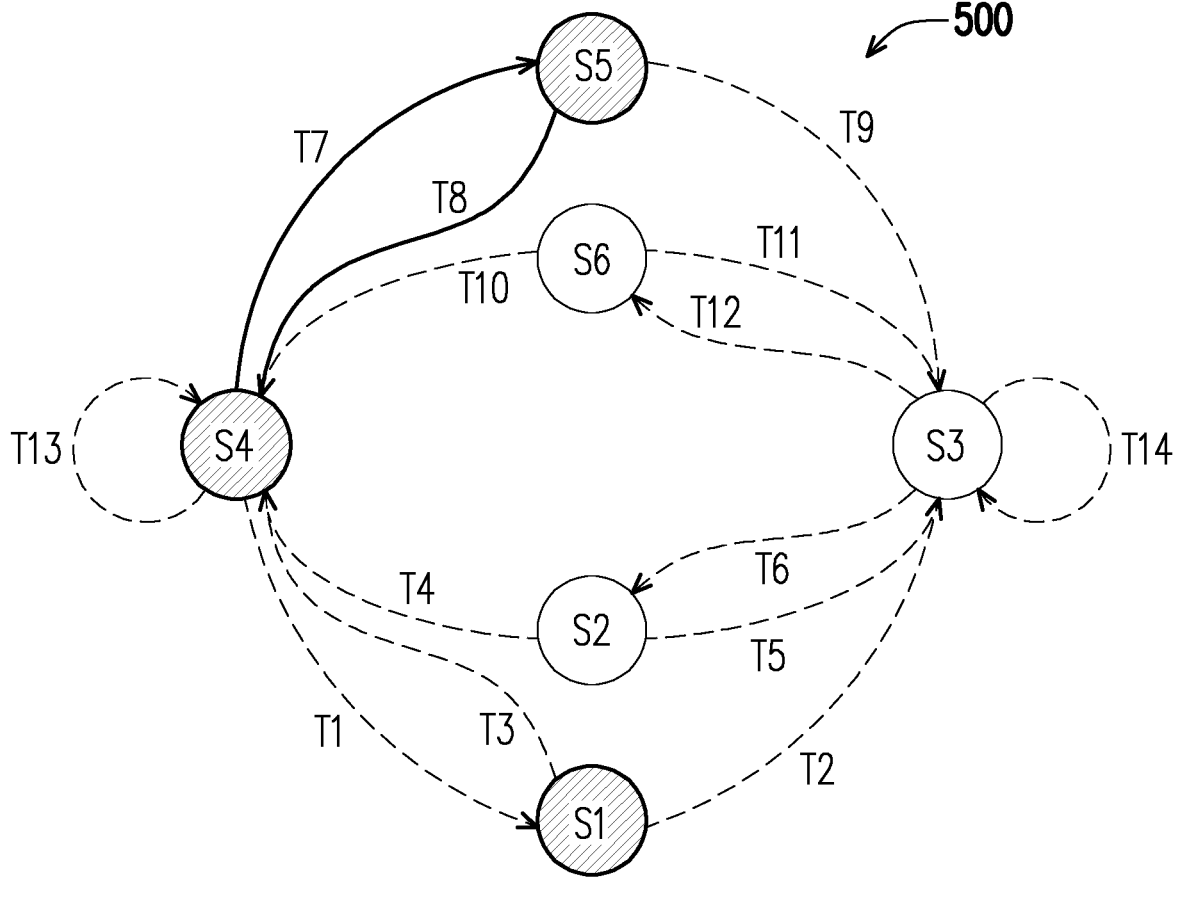
FIG. 11A and FIG. 11B show schematic diagrams of a fifth example of status transition of a detection space according to an embodiment of the invention.
Figure 11B:
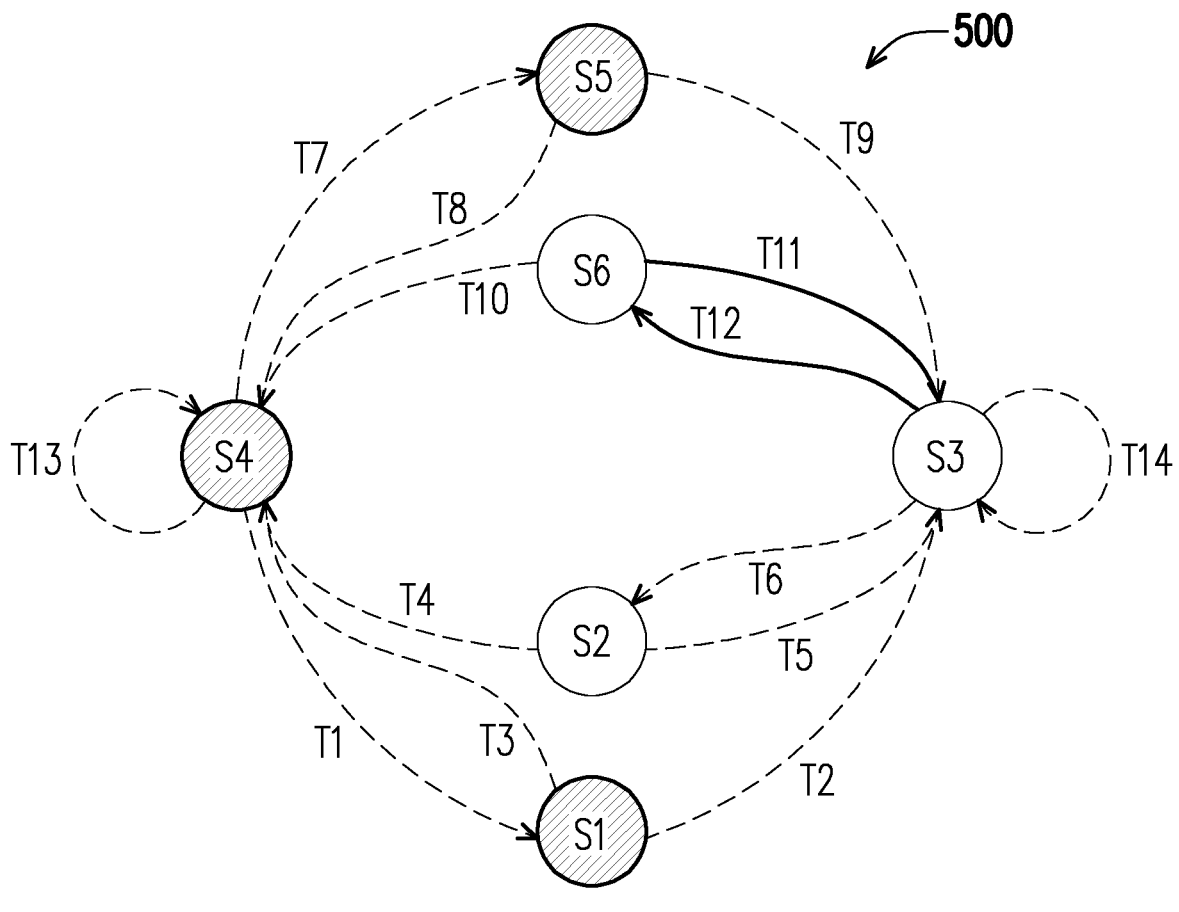

FIG. 11A and FIG. 11B are schematic diagrams showing a fifth example of status transition of a detection space according to an embodiment of the invention, wherein FIG. 11A shows the status machine 500 corresponding to the detection space 210, and FIG. 11B shows the status machine 500 corresponding to the detection space 220. It is assumed that the target person 20 is in the detection space 210. The status S4 of the detection space 210 indicates that the target person 20 is located in the detection space 210, and the status S3 of the detection space 220 indicates that the target person 20 is not in the detection space 220. If the target person 20 disappears from the detection space 210 and appears in the detection space 220, the transition condition T7 of the detection space 210 and the transition condition T12 of the detection space 220 are respectively satisfied, so that the status of the detection space 210 is switched to the status S5, and the status of the detection space 220 is switched to the status S6. Next, if the target person 20 appears in the detection space 210 and disappears from the detection space 220, the transition condition T8 of the detection space 210 and the transition condition T11 of the detection space 220 are respectively satisfied, so that the status of the detection space 210 is switched to the status S4, and the status of the detection space 220 is switched to the status S3.

Figure 12:
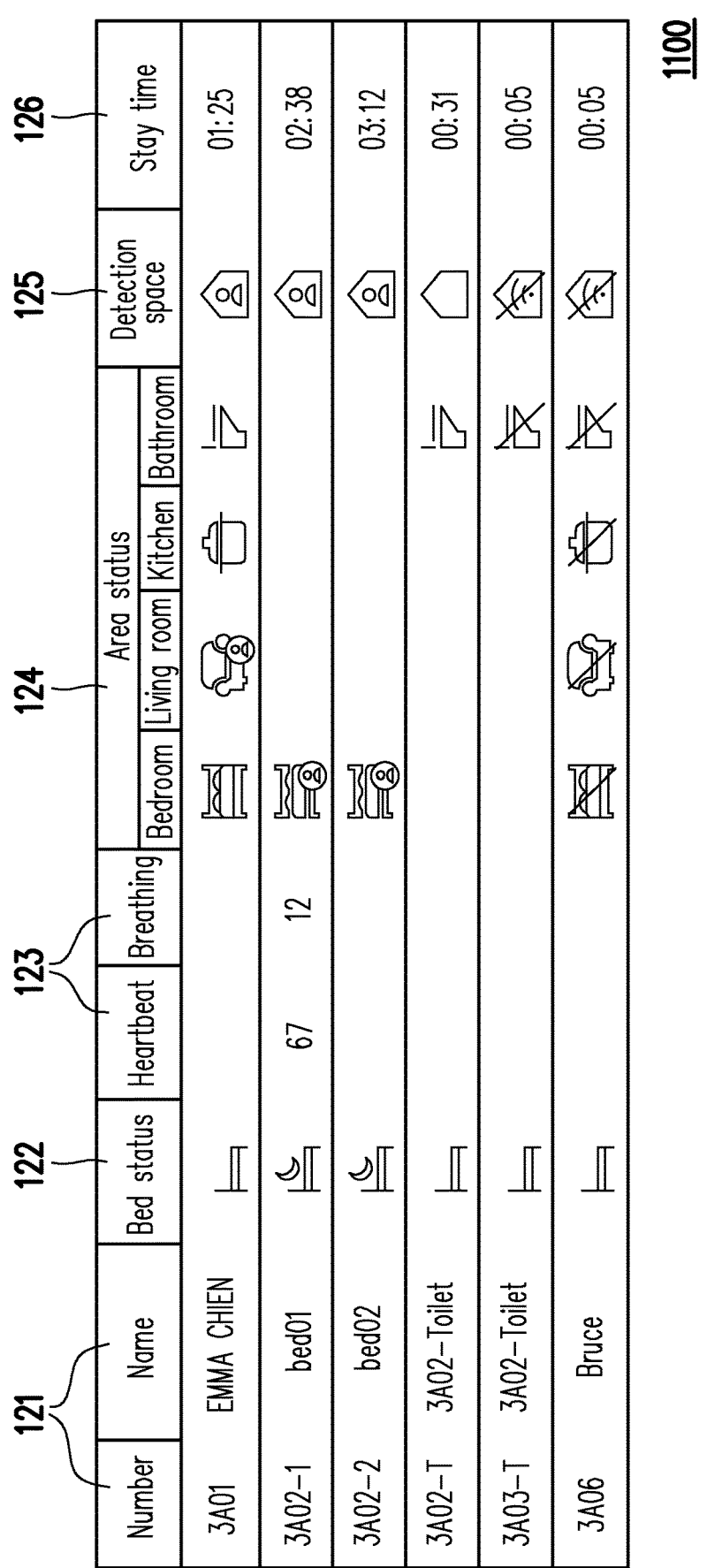
FIG. 12 shows a schematic diagram of a graphical user interface displayed by a human-machine interface according to an embodiment of the invention.

FIG. 12 shows a schematic diagram of a graphical user interface 1100 displayed by the human-machine interface 120 according to an embodiment of the invention. The graphical user interface 1100 may be used to display an icon indicating the physiological status of the target person, and may be used to display an icon indicating the occupancy status of an area in the detection space (e.g., the detection space 210 or 220). For example, the graphical user interface 1100 may include an icon 121 for indicating the number and name of the detection space, an icon 122 for indicating the occupancy status of a bed in the detection space, an icon 123 used to indicate a physiological status such as heartbeat or breathing of the target person 20, an icon 124 used to indicate the occupancy status of an area such as bedroom, living room, kitchen, or bathroom, an icon 125 used to indicate whether the target person 20 is present in the detection space, and an icon 126 used to indicate the stay time of the target person 20 in the detection space.

Figure 13:
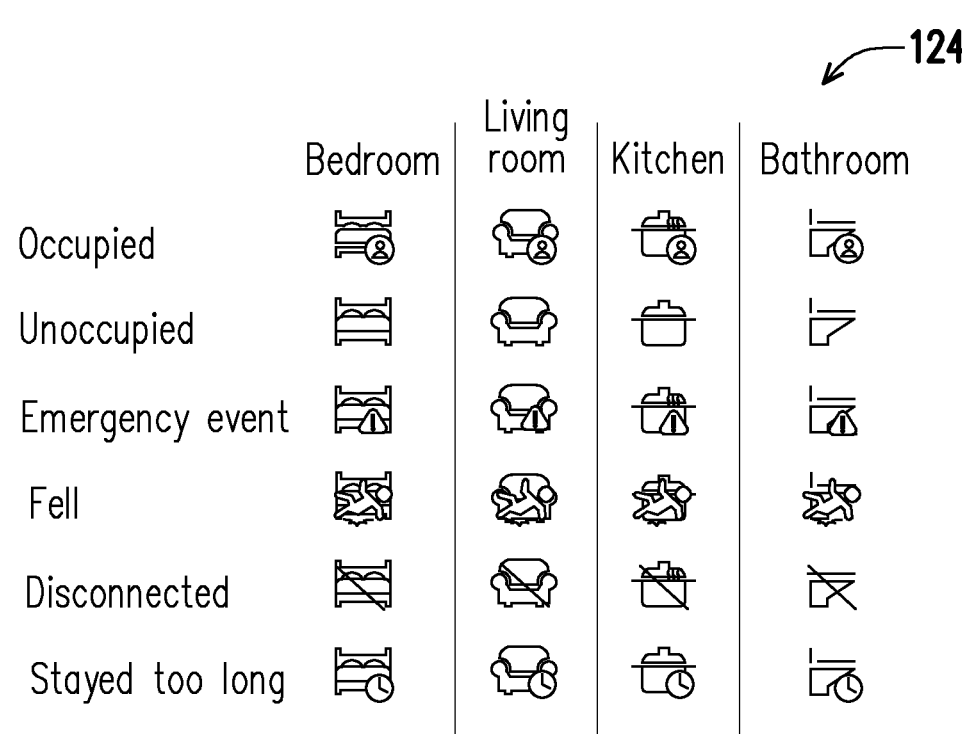
FIG. 13 is a schematic diagram of an icon of a graphical user interface according to an embodiment of the invention.

FIG. 13 is a schematic diagram of the icon 124 of a graphical user interface according to an embodiment of the invention. For an area in the detection space (for example: bedroom, living room, kitchen, or bathroom), the icon 124 may be used to indicate the occupancy status of the area or related events, such as information such as the area is occupied, the area is not occupied, an emergency event occurs in the area, a fall event occurs in the area, the radar used to monitor the area is disconnected, or the target person 20 stays in the area for too long.

Figure 14:
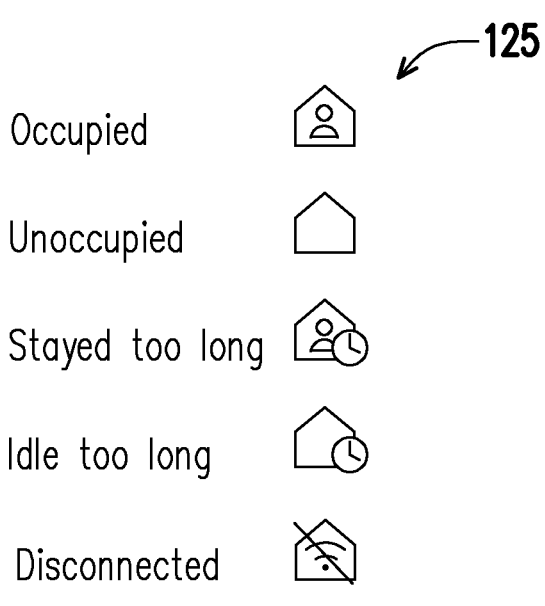
FIG. 14 is a schematic diagram of an icon of a graphical user interface according to an embodiment of the invention.

FIG. 14 is a schematic diagram of the icon 125 of a graphical user interface according to an embodiment of the invention. For the detection space, the icon 125 may be used to indicate the occupancy status of the detection space or related events, such as information such as the detection space is occupied, the detection space is not occupied, the target person stays in the detection space for too long, the detection space is idle (for example: unoccupied) for too long, or the radar used to monitor the detection space is disconnected.

Figure 15:
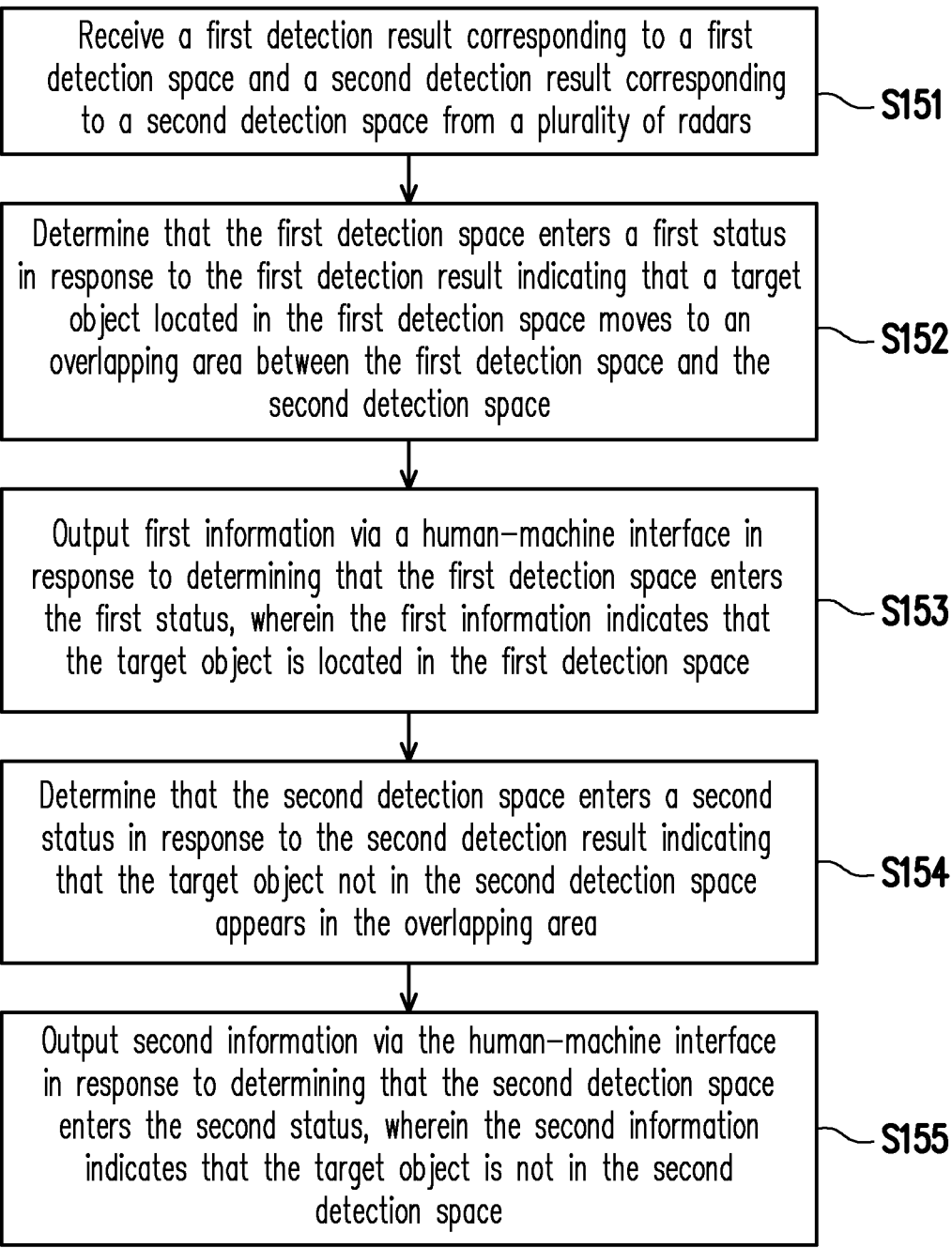
FIG. 15 shows a flowchart of a multi-radar based detection method of a target person according to an embodiment of the invention.

FIG. 15 shows a flowchart of a multi-radar based detection method for a target object according to an embodiment of the invention, wherein the detection method may be implemented by the detection device 100 shown in FIG. 1. In step S151, a first detection result corresponding to a first detection space and a second detection result corresponding to a second detection space are received from a plurality of radars. In step S152, the first detection space entering a first status is determined in response to the first detection result indicating that the target object in the first detection space moves to an overlapping area between the first detection space and the second detection space. In step S153, first information is output via a human-machine interface in response to determining that the first detection space enters the first status, wherein the first information indicates that the target object is located in the first detection space. In step S154, the second detection space entering a second status is determined in response to the second detection result indicating that the target object not in the second detection space appears in the overlapping area. In step S155, second information is output via the human-machine interface in response to determining that the second detection space enters the second status, wherein the second information indicates that the target object is not in the second detection space.

Based on the above, the invention has the following efficacies: in the invention, detection results from a plurality of detection equipment may be integrated to provide the user with real-time information on the location and status of the target person; the invention has a high degree of scalability and flexibility, and the number and position of radars may be flexibly configured according to different application environments to implement monitoring of spaces of different sizes; the human-machine interface of the invention may display the status of a plurality of equipment for the user to quickly understand the field conditions; in the invention, the user may be immediately notified when the status of the target person is abnormal, so that the emergency may be handled as early as possible; in the invention, the status of each of the spaces may be automatically detected to reduce the cost of human resources; the information integrated by the invention may be applied to, for example, human traffic statistics, behavior analysis, or activity record analysis, etc., to improve the application value of the detection results.

What is claimed is:

1. A multi-radar based detection device for a target object, comprising:

a human-machine interface;

a transceiver configured to receive a first detection result corresponding to a first detection space and a second detection result corresponding to a second detection space from a plurality of radars, wherein the plurality of radars monitor the first detection space and the second detection space and generate the first detection result and the second detection result, respectively; and a processor communicatively coupled to the human-machine interface and the transceiver to receive the first detection result and the second detection result and configured to perform:

detecting the target object according to the first detection result and the second detection result;

determining that the first detection space enters a first status in response to determining that the target object in the first detection space moves to an overlapping area between the first detection space and the second detection space based on the first detection result;

outputting first information via the human-machine interface in response to determining that the first detection space enters the first status, wherein the first information indicates that the target object is located in the first detection space;

determining that the second detection space enters a second status in response to determining that the target object, which was not detected in the second detection space, appears in the overlapping area based on the second detection result;

outputting second information via the human-machine interface in response to determining that the second detection space enters the second status, wherein the second information indicates that the target object is not in the second detection space;

obtaining a plurality of point clouds respectively corresponding to a plurality of time points from the first detection result;

performing an object detection on the plurality of point clouds to generate a plurality of bounding boxes respectively corresponding to the plurality of point clouds;

determining an inclination angle change of the target object during a default period according to the plurality of bounding boxes; and determining that the target object fell in response to the inclination angle change being greater than an inclination angle threshold value.

2. The detection device of claim 1, wherein the processor is further configured to perform:

determining that the first detection space enters a third status from the first status in response to the first detection result indicating that the target object disappears from the first detection space; and outputting third information via the human-machine interface in response to determining that the first detection space enters the third status, wherein the third information indicates that the target object is not in the first detection space.

3. The detection device of claim 2, wherein the processor is further configured to perform:

determining that the second detection space enters a fourth status from the second status in response to the second detection result indicating that the target object moves to the second detection space from the overlapping area; and outputting fourth information via the human-machine interface in response to determining that the second detection space enters the fourth status, wherein the fourth information indicates that the target object is located in the second detection space.

4. The detection device of claim 1, wherein the processor is further configured to perform:

determining that the first detection space enters a fourth status from the first status in response to the first detection result indicating that the target object moves to the first detection space from the overlapping area; and outputting the first information via the human-machine interface in response to determining that the first detection space enters the fourth status.

5. The detection device of claim 4, wherein the processor is further configured to perform:

determining that the second detection space enters a third status from the second status in response to the second detection result indicating that the target object disappears from the second detection space; and outputting the second information via the human-machine interface in response to determining that the second detection space enters the third status.

6. The detection device of claim 1, wherein the processor is further configured to perform:

determining that the first detection space enters a fifth status in response to the first detection result indicating that the target object located in the first detection space disappears from the first detection space; and outputting the first information via the human-machine interface in response to determining that the first detection space enters the fifth status.

7. The detection device of claim 6, wherein the processor is further configured to perform:

determining that the first detection space enters a fourth status from the fifth status in response to the first detection result indicating that the target object appears in the first detection space; and outputting the first information via the human-machine interface in response to determining that the first detection space enters the fourth status.

8. The detection device of claim 6, wherein the processor is further configured to perform:

determining that the first detection space enters a third status from the fifth status in response to the first detection result indicating that the target object does not appear in the first detection space; and outputting third information via the human-machine interface in response to determining that the first detection space enters the third status, wherein the third information indicates that the target object is not in the first detection space.

9. The detection device of claim 1, wherein the processor is further configured to perform:

determining that the first detection space enters a third status in response to the first detection result indicating that the target object located in the first detection space disappears from a default area in the first detection space; and outputting third information via the human-machine interface in response to determining that the first detection space enters the third status, wherein the third information indicates that the target object is not in the first detection space.

10. The detection device of claim 1, wherein the processor is further configured to perform:

determining that the second detection space enters a sixth status in response to the second detection result indicating that the target object not in the second detection space appears in the second detection space; and outputting the second information via the human-machine interface in response to determining that the second detection space enters the sixth status.

11. The detection device of claim 10, wherein the processor is further configured to perform:

determining that the second detection space enters a third status in response to the second detection result indicating that the target object disappears from the second detection space when the second detection space is in the sixth status; and outputting the second information via the human-machine interface in response to determining that the second detection space enters the third status.

12. The detection device of claim 10, wherein the processor is further configured to perform:

determining that the second detection space enters a fourth status from the sixth status in response to the second detection result indicating that the target object does not disappear from the second detection space; and outputting fourth information via the human-machine interface in response to determining that the second detection space is located in the fourth status, wherein the fourth information indicates that the target object is located in the second detection space.

13. The detection device of claim 1, wherein the processor is further configured to perform:

determining that the second detection space enters a fourth status in response to the target object not in the second detection space appearing in a default area in the second detection space; and outputting fourth information via the human-machine interface in response to determining that the second detection space enters the fourth status, wherein the fourth information indicates that the target object is located in the second detection space.

14. The detection device of claim 1, wherein the processor is further configured to perform:

determining a physiological status of the target object included in the first detection result and the second detection result; and outputting, in addition to the first information and the second information, a graphical user interface via the human-machine interface, wherein the graphical user interface displays a first icon for indicating the physiological status of the target object, wherein the physiological status comprises at least one of a heartbeat and a breathing rate.

15. The detection device of claim 14, wherein the graphical user interface is further configured to display a second icon for indicating an occupancy status of an area in the first detection space, wherein the second icon is associated with at least one of the following: a bed, a bedroom, a living room, a kitchen, and a bathroom, and the graphical user interface is further configured to display whether a radar is disconnected.

16. The detection device of claim 1, wherein the processor is further configured to perform:

calculating a stay time of the target object in the first detection space in response to the first detection result indicating that the target object is located in the first detection space;

outputting a first warning message via the human-machine interface in response to the stay time being greater than a first threshold value; and outputting a second warning message via the human-machine interface in response to the stay time being less than a second threshold value.

17. The detection device of claim 1, wherein the processor is further configured to perform:

determining whether the target object fell in the first detection space according to the first detection result; and outputting a warning message via the human-machine interface in response to determining that the target object fell.

18. The detection device of claim 1, wherein the processor is further configured to perform:

calculating an away time of the target object in response to the first detection result indicating that the target object is to leave the first detection space; and outputting a warning message via the human-machine interface in response to the away time being greater than a third threshold value.

19. The detection device of claim 1, wherein the processor is further configured to perform:

determining a speed of the target object or a height of the target object during the default period according to the plurality of bounding boxes; and determining that the target object fell in response to the height being less than a fifth threshold value or the speed being greater than a sixth threshold value.

20. A multi-radar based detection method for a target object, comprising:

receiving a first detection result corresponding to a first detection space and a second detection result corresponding to a second detection space from a plurality of radars from a plurality of radars, wherein the plurality of radars monitor the first detection space and the second detection space and generate the first detection result and the second detection result, respectively;

detecting the target object according to the first detection result and the second detection result;

determining that the first detection space enters a first status in response to determining that the target object in the first detection space moves to an overlapping area between the first detection space and the second detection space based on the first detection result;

outputting first information via a human-machine interface in response to determining that the first detection space enters the first status, wherein the first information indicates that the target object is located in the first detection space;

determining that the second detection space enters a second status in response to determining that the target object, which was not detected in the second detection space, appears in the overlapping area based on the second detection result;

outputting second information via the human-machine interface in response to determining that the second detection space enters the second status, wherein the second information indicates that the target object is not in the second detection space;

obtaining a plurality of point clouds respectively corresponding to a plurality of time points from the first detection result;

performing an object detection on the plurality of point clouds to generate a plurality of bounding boxes respectively corresponding to the plurality of point clouds;

determining an inclination angle change of the target object during a default period according to the plurality of bounding boxes; and determining that the target object fell in response to the inclination angle change being greater than an inclination angle threshold value.

\* \* \* \* \*